UNITED STATES PATENT OFFICE.

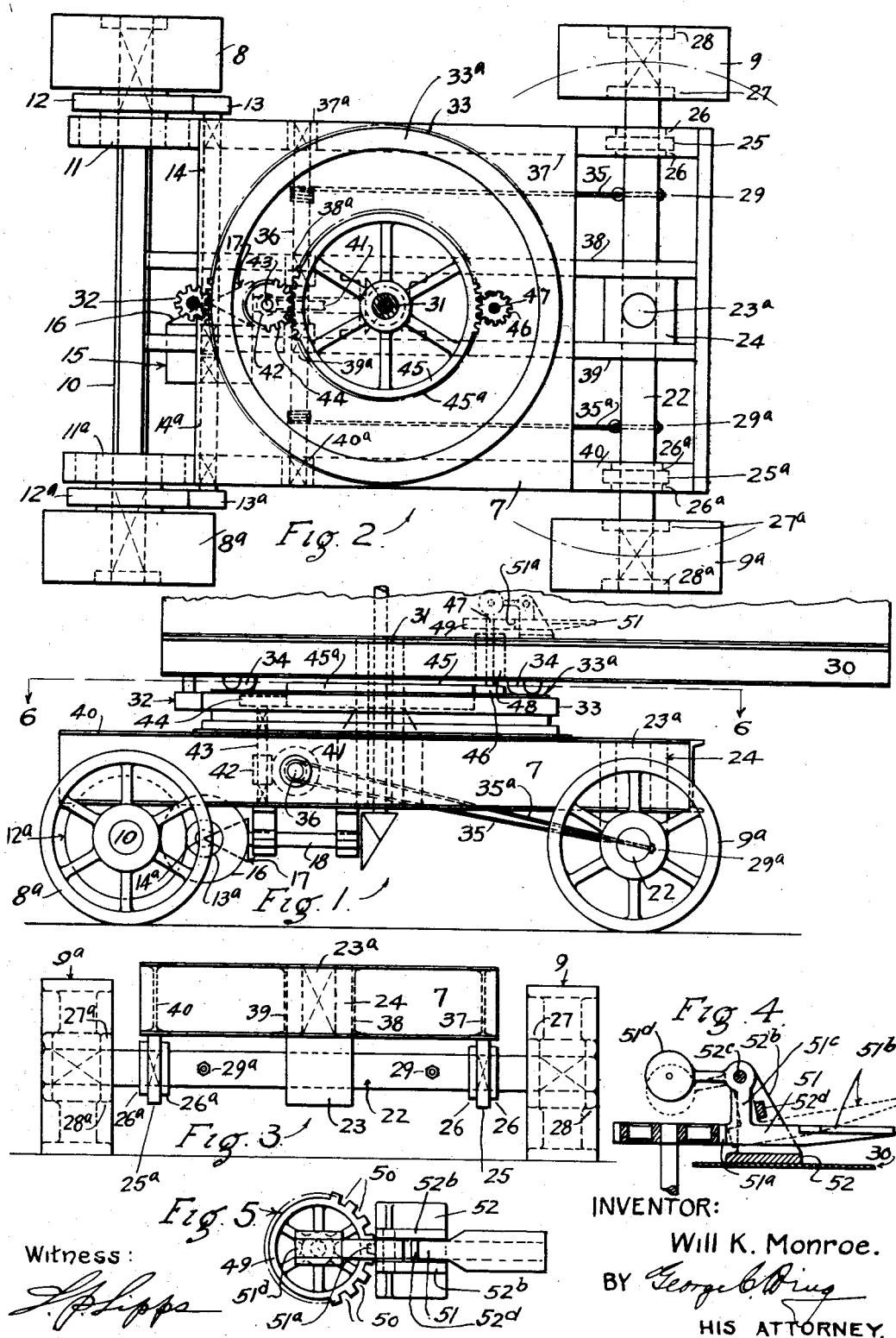

WILL K. MONROE, OF CLEVELAND, OHIO, ASSIGNOR TO THE BROWN HOISTING MACHINERY COMPANY, OF CLEVELAND, OHIO, A CORPORATION.

MEANS FOR STEERING TRACTORS.

1,404,468.  Specification of Letters Patent.  Patented Jan. 24, 1922.

Application filed May 6, 1921. Serial No. 467,369.

*To all whom it may concern:*

Be it known that I, WILL K. MONROE, a citizen of the United States, residing at the city of Cleveland, in the county of Cuyahoga and State of Ohio, have invented a certain new and useful Means for Steering Tractors, of which the following is a full, clear, and exact description, reference being made to the accompanying drawings, forming a part of the specifications, wherein similar parts are designated by the same letters or numerals in each case.

The invention as specifically described relates to that class of tractors of the so-called fifth wheel type, which are designed for surface travel, in contradistinction to those for travel on rails or other specially prepared or fixed trackways, and which support and carry a revolvable superstructure together with the engines, tanks, booms, boom-operating and hoisting and lowering mechanisms and parts, that characterize such instrumentalities as locomotive cranes, derricks, etc.

In constructions of the sort, where the course or path of the machine is not already laid out and determined, but varies with each occasion, it is obvious that the steering control should not only be positive in action and readily applied, but exercisable by the operator without leaving his station on the superstructure or without much interruption of his main duties there.

It is accordingly the object of the present invention to provide a steering device which is operable from the superstructure by means of a pedal or other arrangement or connection to the end that the power mechanism on the crane may be directly utilized to actuate the steering device without need of the addition and mediation of special, costly and cumbersome gears and other machinery for the purpose.

In the drawings Figure 1 is a side elevation, partially broken away, of a tractor locomotive crane embodying the invention. Figure 2 is a sectional view, on the lines 6, 6 of Fig. 1. It shows the truck in plan, and the superstructure, rotating shafts, and certain of the steering gear, in section. Figure 3 is an end view of the truck showing the steering wheels and their axle, and the connection of the axle to the truck-frame. Figure 4 is a side view in section of a counterweighted dog and its supporting bracket, for engaging the superstructure to the steering gear actuating mechanism, and, Figure 5 is a plan view of the parts shown in Fig. 4.

The mechanism shown comprises a rectangular truck-frame 7 made up of heavy I-beam sections in the usual manner. It carries an annular rack or gear 33, firmly mounted upon the same, whose upper surface 33ª is adapted to serve as a circular track for the rollers 34, 34 which support the platform or superstructure 30, and rest upon and are in operative relation to said upper surface 33ª.

This platform or superstructure 30, thus supported upon said frame 7, is connected thereto by a hollow central pin 31 around which it is adapted to be turned.

As will be understood by those familiar with the art, a means of rotating the platform 30, is afforded by locating a pinion 32 below said platform in mesh with the rack 33, with the shaft of the pinion extending freely upwardly through the platform to the source of power thereon.

The frame 7 itself, is mounted upon wheels for its support and travel. These, as shown, consist of a pair of oppositely located traction wheels 8 and 8ª at the rear end of the frame 7, and a pair of similarly located steering wheels at the other or forward end. The wheels 8 and 8ª are loosely mounted on the ends of a fixed axle 10, which is itself rigidly connected to the frame 7, by tight bearings, at 11 and 11ª respectively. Spur gears 12 and 12ª are fastened to the inner faces or sides of the wheels 8 and 8ª, and severally in mesh therewith, are pinions 13 and 13ª on the outer ends of driving shafts 14, 14ª. These shafts extend inwardly, in alignment one with the other, transversely of the frame 7 to a differential gear 15, to which they are operatively connected at their inner ends. The function and construction of said gear, are sufficiently familiar to those versed in the art to be understood without a more detailed recital here with respect to the same.

The steering wheels 9 and 9ª are loosely mounted on a swivel-axle 22, provided, at its central portion, with a tight fitting swivel member 23, which has an upwardly projecting member, or pin 23ª that fits into a companion member 24. The member 24 is affixed to the forward end of the truck frame.

As constructural features, rollers indicated by 25 and 25$^a$, are shown on the axle 22, in bearing with the frame, to prevent tipping. They are held in place by collars 26 and 26$^a$. Collars 27 and 27$^a$ and nuts 28 and 28$^a$, are also shown to keep the steering wheels in their positions and, in Fig. 3 anchor bolts 29 and 29$^a$, for the cables controlling said axle, appear thereon at each side of the swivel member 23. The steering wheels are controlled by cables or similar flexible devices 35 and 35$^a$. These are fastened to the anchorages represented, respectively, by the anchor bolts 29 and 29$^a$, the cable 35 passing from its said anchorage rearwardly to and over a transverse shaft 36, and, after several wraps around the shaft, being fastened thereto, and, the cable 35$^a$ passing to and under said shaft and being thereafter similarly fastened to the same. In consequence, any axial rotation of the shaft, in one direction or the other, will correspondingly wind in one cable and pay out the other, and thereby turn the shaft and the pair of wheels about the swivel member 24.

The shaft 36 itself extends across the truck frame through the webs of the horizontal members 37, 38, 39 and 40, whereby it is supported in journals 37$^a$, 38$^a$, 39$^a$ and 40$^a$.

In order to effect said rotation, and the consequent steering movement of the wheels 8 and 8$^a$, a worm-gear 41 is keyed to the shaft 36 midway of the same, in mesh with a worm 42, on a vertically mounted shaft 43 which shaft extends upwardly above the truck-frame 7, within the annular gear 33.

At this point the shaft is provided with a horizontal spur pinion 44 which meshes with the lower half of the gear-face 45$^a$ of an intermediate gear 45, loosely mounted on the center pin 31 just above the truck frame 7. The face of the idler, or intermediate gear 45, is of suitable width to accommodate both the pinion 44, and a second spur pinion 46 which is located in mesh with the upper half of said gear-face 45$^a$ as now to be described.

That is to say, when so located, the pinion 46 is mounted horizontally below the superstructure 30 on the lower end of an upright shaft 47, which, journaled in a bearing 48, passes through and above the floor of the superstructure 30. Keyed to the upper end of the shaft is a horizontal gear-like wheel 49 (Fig. 5), provided with recesses 50 at the circumference, for receiving the tooth 51$^a$ of the dog 51.

The parts and devices variously located on and carried by said truck and platform as described by their cooperative character, may be regarded as a unitary means of effecting the steering desired when force is applied to that end.

For the purpose of making available such force and enabling it to be applied at the superstructure, said dog 51 is provided. It is made up of a vertically disposed arm, or member 51$^c$, and a pedal extension therefrom 51$^b$ having a tooth 51$^a$, at its inner end of suitable dimensions to be propelled within and register with the recesses 50, when moved forward toward the same for the purpose. The dog is secured to the floor of the superstructure in operative proximity to the wheel part, or member 49, and is held in place by a support 52 consisting of a base 52$^a$, having two upright ears 52$^b$, between which the dog is pivoted and hung upon a pin 52$^c$.

In order to keep the dog tooth 51$^a$ out of engagement with the wheel 49 when a steering movement is not in progress, a counterweight 51$^d$ is attached to the pivotal point of the dog 51. The stop 52$^d$ extends between the ears 52$^b$ to limit the swing of the counterweight. The position of the counterweight when at such limit is indicated in dotted lines in Fig. 4.

The employment of a differential gearing as shown in the drawings, is not essential to the invention claimed, although in practice, a steering movement is facilitated by such arrangement. When such feature is not present in the tractor, the bevel gear 16 should be fastened on the axle 10, and the cross shafts 14 and 14$^a$, and the pinions 13 and 13$^a$ with their companion 12 and 12$^a$ should also be omitted from the construction. In such case the shaft 18 must, of course, be prolonged so that the gear 17 will mesh with the gear 16 in its new position. The bearings at 11 and 11$^a$ will then be loose, instead of tight, and the wheels 8 and 8$^a$ be keyed to the axle.

When the direction of a tractor such as described, is to be changed from an assumed normal or straight course, the operator will step upon the foot-lever or member 51$^b$. This will force the tooth 51$^a$ into a recess of the wheel, or gear 45, and through the wheel 49, shaft 47, and pinion 46, lock the transmission gear 45 to the platform or superstructure 30.

The operator should now start the rotation of the superstructure, in whichever direction the truck is to be steered, which is, of course, effected by energizing the pinion 32, from the assumed source of power with which it is connected for the purpose, whereupon the pinion, being in mesh with the fixed rack 33, will rotate around said rack, and at the same time, carry the platform or superstructure with which it is connected, around the central pin 31. In this manner, because the superstructure and gear are interlocked, and have a common axis of revolution around the vertical shaft 21, said gear 45, will be rotated with the superstructure, and, in its course, will actuate the pinion 44 and, indirectly, the shaft 43 and all the other members of the train, and parts, dependent upon the same. That is to say, in their co-operative action, the worm 42 will energize the gear 41, the latter the transverse shaft 36, and this, in turn will wind in and pay out the cables 35 and 35ª which will swivel the axle 22, and turn the wheels 9 and 9ª as designed.

Although I have illustrated my invention herein by a specific form, I do not intend to limit the same to such form, and I have accordingly added claims for comprehending the idea in the broader sense.

What I claim, and wish to secure by Letters Patent, is:—

1. A means for steering tractors, comprising the combination with a truck having steering and traction wheels, a platform rotatably mounted on said truck, flexible devices respectively connected to the axle of the steering wheels at their one ends, and fastened reversely to a winding shaft on said truck at their other ends, mechanism for rotating said shaft when actuated by the rotatory movement of said platform, together with means, operable from the platform, for engaging said platform and mechanism for the purpose at different points of the rotatory travel of the platform, without regard to the relative position of platform and truck at the time, substantially as shown and described.

2. As a means for steering tractor cranes and similar vehicles, the combination with a truck having a platform rotatably supported above said truck, and power mechanism on said platform for rotating the same, of steering wheels loosely mounted upon an axle pivotally connected to said truck at one end of the same; flexible members fastened to said axle at each side of the center, and leading backwardly to and reversely wound around a rotatable shaft on said truck; a gear on said shaft in mesh with a gear on a vertical shaft which extends upwardly above said truck; a pinion on the upper end of said shaft in mesh with the lower circumferential face of a transmission gear loosely mounted around the axis of rotation of said platform; a vertical shaft extending upwardly through said platform; a pinion keyed to said shaft in mesh with the upper circumferential face of said transmission gear, and cooperating means on said shaft and platform for interlocking the same, substantially as shown and described.

3. As a means for steering tractor cranes and similar vehicles, the combination with a truck having a platform rotatably supported above said truck, and power mechanism on said platform for rotating the same, of steering wheels loosely mounted upon an axle pivotally connected to said truck at one end of the same; flexible members fastened to said axle at each side of the center and leading backwardly to and reversely wound around a rotatable shaft on said truck; a worm-gear on said shaft in mesh with a worm on a vertical shaft which extends upwardly above said truck; a pinion on the upper end of said shaft in mesh with the lower circumferential face of a transmission gear loosely mounted around the axis of rotation of said platform; a vertical shaft extending upwardly through said platform; a pinion keyed to said shaft in mesh with the upper circumferential face of said transmission gear, and cooperating means on said shaft and platform for interlocking the same, substantially as shown and described.

4. A tractor vehicle comprising the combination of a truck frame mounted on a pair of traction wheels at one end, and a pair of steering wheels loosely mounted on a swiveled axle at the other end; a rotatable platform upon said frame and power mechanism for rotating the same on said platform; a transmission gear revolvable concentrically with the platform; a winding shaft cross-wise of the frame; a worm gear thereon; an upright shaft extending vertically through said frame; a worm on the same in mesh with said worm-gear and a spur-pinion in mesh with the lower circumferential face of the transmission gear; cables severally attached to the axle of the steering wheels near its ends and wound reversely about said winding shaft; a spur pinion in mesh with the upper circumferential face of the transmission gear; a shaft therefor extending upwardly through said platform; a horizontal wheel, provided with circumferential recesses, keyed to said shaft above said platform, and means on said platform for positively engaging said recesses when said means are actuated for the purpose, all substantially as shown and described.

WILL K. MONROE.

Witnesses:
L. P. Lipps,
J. F. Edmunds.